United States Patent [19]

de Rham

[11] Patent Number: 4,748,034

[45] Date of Patent: May 31, 1988

[54] PREPARING A HEAT STABLE AQUEOUS SOLUTION OF WHEY PROTEINS

[75] Inventor: Olivier de Rham, La Tour-de-Peilz, Switzerland

[73] Assignee: Nestec S.A., Vevey, Switzerland

[21] Appl. No.: 854,057

[22] Filed: Apr. 18, 1986

Related U.S. Application Data

[63] Continuation of Ser. No. 601,164, Apr. 17, 1984, abandoned.

[30] Foreign Application Priority Data

May 13, 1983 [CH] Switzerland ................ 2615/83

[51] Int. Cl.$^4$ .............. A23C 21/00; A23C 21/08; A23C 21/10
[52] U.S. Cl. .................. 426/330.2; 426/583; 426/491
[58] Field of Search .............. 426/330.2, 583, 491

[56] References Cited

U.S. PATENT DOCUMENTS

| | | | |
|---|---|---|---|
| 1,085,380 | 1/1914 | Downham | 426/583 |
| 1,609,617 | 12/1926 | Frohring | 426/330.2 |
| 2,555,514 | 6/1951 | Sharp et al. | 426/583 |
| 2,570,231 | 10/1951 | Hansen | 426/330.2 |
| 3,348,955 | 10/1967 | Stewart | 426/330.2 |
| 3,922,375 | 11/1975 | Dalan et al. | 426/583 |
| 4,138,501 | 2/1979 | Chaveron et al. | 426/330.2 X |
| 4,497,836 | 2/1985 | Marquardt et al. | 426/583 X |

OTHER PUBLICATIONS

Furia, CRC Handbook of Food Additives, 2nd Ed., 1972, CRC Press: Cleveland, Ohio, pp. 668-670.

*Primary Examiner*—Joseph Golian
*Attorney, Agent, or Firm*—Vogt & O'Donnell

[57] ABSTRACT

A process for the production of a whey product which contains whey proteins in a form which is heat stable at a neutral pH. An aqueous solution which contains whey proteins in a form which has not been rendered insoluble is prepared and the Ca, Mg, citrate and/or phosphate concentrations of the solution are adjusted as is its pH to conform to the relationships:

[Ca+Mg - citrate] < 0 mM when $5.5 \leq pH < 6.2$
[Ca+Mg - citrate] < 4 mM when $6.2 \leq pH < 7.2$ and
[Ca+Mg - citrate - phosphate] < 4 mM when $7.2 \leq pH \leq 9.0$

16 Claims, No Drawings

PREPARING A HEAT STABLE AQUEOUS SOLUTION OF WHEY PROTEINS

This is a continuation of Ser. No. 601,164, filed on Apr. 17, 1984 now abandoned.

The present invention relates to a process for the production of a whey product which contains whey proteins in a form which is heat stable at a neutral pH.

A process is known for the production of a whey protein product which is heat stable at a pH of ≦4.0 and has a weight ratio of calcium:protein of 0.2-5:100, ash:protein of 2-20:100 and calcium:ash of 2-35:100. This known product should have a protein content of greater than 50% based on dry matter and is produced from whey by firstly adjusting the ratio of calcium: protein to a value of 3-9:100 and subsequently carrying out molecular separation at a pH value of 6.5 or 3.0. This known product is intended for supplementing carbonated or uncarbonated fruitflavoured acidic beverages. The acidic beverages which have been supplemented in this manner may be sterilised by heating without any protein precipitating.

However, there are other instances where whey proteins are required to be heat stable but where the abovementioned known processes do not always attain the desired result. This is notably the case for some beverages which have a neutral pH and which are to a large extent composed of whey proteins and even more so for some types of milk which have been modified for the needs of infants.

Thus an object of the present invention is to provide a process for the production of a whey product which contains whey proteins in a form which is heat stable at a neutral pH value.

To this end, the process according to the present invention is characterised in that an aqueous solution is prepared which contains whey proteins in a form which has not been rendered insoluble and the Ca, Mg, citrate and/or phosphate concentrations of the solution are adjusted, as is its pH value, to conform to the following relationships:

[Ca+Mg−citrate]<0 mM when 5.5≦pH<6.2
[Ca+Mg−citrate]<4 mM when 6.2≦pH<7.2 and
[Ca+Mg−citrate−phosphate]<4 mM when 7.2≦pH≦9.0.

It was established that the calcium:protein ratio, as used in the above-mentioned prior art, could not be relied upon to prevent the heated whey proteins from precipitating at a neutral pH.

In this context, the terms Ca, Mg, citrate and phosphate are to be understood as designating the free form and the bound form of the ions concerned. Thus, by way of example, the symbol Ca is to be understood as designating not only the ionized form $Ca^{++}$ but also the chelated form of calcium and it is the total calcium concentration which is to be included in the abovementioned relationships.

Moreover, in this context, the proteins are regarded and determined as being total nitrogen multiplied by 6.38.

The term "neutral pH" is to be understood, in this context, as designating a pH of about pH 7, which does not fall below pH 5.5 or exceed 9.0 and is preferably within the narrower limits of, for example, pH 6.5 and pH 7.5. This latter range includes typical pH values of different types of milk which have been modified for the needs of infants.

Likewise, the term "proteins which are heat stable" is to be understood, in this context, as designating proteins of which more than 80% remain soluble after a heat treatment corresponding to sterilization. The terms precipitate and precipitation are to be understood as meaning coagulation or rendering insoluble. In contrast, the meaning of denaturation is restricted, in this context, to an alteration in the structure of whey proteins by any treatment with heat, acid or base. During the course of a harsh treatment and particularly during sterilization, this denaturation may cause an aggregation reaction and precipitation.

Whey proteins have been found to precipitate at a neutral pH under the effect of a heat treatment corresponding to sterilization even if the ratio of calcium: protein has an apparently low value. A detailed study of the mechanisms involved in this precipitation brought to light various facts which enabled the present process to be perfected in a straight-forward, reliable and exact manner.

The heat stability of the proteins in the products which were obtained by the present process was determined by a suitable test which is clearly distinguishable from the two known methods which are currently used in this field. The first of these known methods consists of determining the denaturation of whey proteins by acidifying the substance to a pH of 4.6, centrifuging it and determining the nitrogen in the supernatant. It has now been found that an identical heat treatment which causes similar denaturations may in fact have very varied effects on the solubility of the product, depending on which product is used, the pH at which heat treatment takes place and the concentration of free calcium during this treatment.

The second of these known methods is based on measuring the volume of the precipitate. The hydration of the precipitate has been found to vary depending on the conditions under which precipitation occurs. For this reason, it was decided to determine the stability of the whey proteins under heating by separating the precipitated proteins at the pH at which the heat treatment takes place, determining the nitrogen in the supernatant and calculating the stability by comparison with the initial quantity of nitrogen before it was subjected to heating.

An appropriate straight-forward test was devised on this principle and consists of introducing 10 ml of solution into a beaker, rapidly (about 20 s) raising the temperature to 95° C. by steam injection and maintaining the solution at this temperature for 5 mins by bubbling in steam. The beaker is then plunged into a bath of running water, the contents of the beaker are poured into a 50 ml graduated flask, the flask is filled up to the 50 ml mark with distilled water, the solution is centrifuged at 2,500 g for 10 mins, the nitrogen content of the supernatant is determined, this is divided by the nitrogen content of the original solution and multiplied by one hundred. In other words, the ratio of "nitrogen in solution after sterilization at the pH under consideration":"nitrogen in solution before sterilization" is determined and expressed as a percentage.

This test has been confirmed as producing a result which is generally definitive and a decisive increase in the effect is not produced by extending the bubbling time with steam or increasing the temperature. It has been found to be satisfactory from a practical point of view to keep the solubility of the proteins above 80% under these test conditions.

Thus, the above-mentioned detailed study of the mechanisms involved in precipitation was carried out on the basis of this test by varying the material, the pH value and the ionic medium. The present process which is the product of this study surprisingly overcomes the significant problems which are met in practice. The process does not only have the advantage of being straight-forward and easy to master but also guarantees that the product has the desired heat stability, that is, more than 80% of the whey protein remains soluble when subjected to a heat treatment corresponding to sterilization. The reliability of the process is even more surprising when one considers the harshness of the heat treatment which is used.

Any whey starting material containing whey proteins in a form which has not been rendered insoluble may be used in the present process. This starting material may be cheese whey and in particular so-called sweet whey, such as the whey which is produced by coagulating the casein with rennet, or so-called acid whey such as the whey which is produced by acid coagulation of casein. Whey which has been demineralized by, for example, ion exchange or electrodialysis may also be used as the starting material, as may a whey protein concentrate which has been produced by, for example, ultrafiltration or dialysis. The starting substance may equally well be in the form of an aqueous solution, a concentrate or a powder, but it must fulfill the condition that its proteins have not been rendered insoluble particularly during concentration or drying.

Sweet whey is preferably used which has optionally been demineralised, in particular by ion exchange, or ultrafiltrated and/or diafiltrated and/or concentrated by evaporation or reverse osmosis.

Whey may be used as such after it has optionally been demineralised, ultrafiltrated and/or diafiltrated or a concentrate may be diluted or a powder dissolved to produce the aqueous solution. Extremely variable ionic compositions are obtained for the different whey products depending on the starting material, the method which is used and the operating conditions.

Various means may be used to adjust the concentrations to conform to the above-mentioned relationships depending on the type of product to be made stable. In particular, the solution may be diluted with demineralised water; or citrate and/or phosphate in the form of an appropriate chemical compound which may be chosen from suitable salts of sodium or potassium, for example, may be added, thereby masking the calcium and magnesium; or the pH value may be increased, thereby encouraging the formation of calcium or magnesium complexes with the polyvalent anions which are present; or undesirable ions may be exchanged for desirable ions on ion exchangers or by electrodialysis. The product may also be dialysed or ultrafiltrated and/or diafiltrated at an acid pH that is at a pH below the range delimited above for a neutral pH and preferably at a pH of about 4.5.

The pH may be adjusted by any appropriate method used in the food industry which is compatible with the present process. The simplest method of doing this is to lower or increase the pH with, for example, hydrochloric acid, citric acid or phosphoric acid or sodium or potassium hydroxide or sodium carbonate respectively.

Regarding the relationships between the Ca, Mg, citrate and/or phosphate concentrations and the pH, the limit of the molar concentration not to be exceeded for the sum of Ca and Mg after deduction of citrate and/or phosphate, on the one hand, varies as a function of the pH value and the phosphate, on the other hand, has a virtually imperceptible effect below pH 7.2. Therefore, the Ca+Mg−citrate concentration should be less than 0 mM at a pH value of 5.5 to less than 6.2, whereas it may rise to about 4 mM at a pH of 6.2 to less than 7.2. Above 7.2, the Ca+Mg−citrate−phosphate concentration should be less than 4 mM.

In view of this, it is possible that other calcium or magnesium complexes, such as with phytate, serine phosphate, pyrophosphate and polyphosphates or with EDTA, could be used. Their effectiveness was thus examined at appropriate pH values, but it is preferable in the present process only to adjust the concentration with elements which are naturally present in large quantities in whey.

Thus, the whey product which is produced by the present process contains whey proteins in a form which is heat stable, that is more than 80% stable under the effect of heat so that its use in the manufacture of beverages which have a neutral pH value, and in particular in the manufacture of different types of milk which have been modified for the needs of infants, is compatible with heat treatments corresponding to the sterilization which is used in the manufacture or use of beverages of this type.

The following Examples illustrate the process according to the present invention. Percentages are given in percent by weight, unless otherwise specified.

In the following Examples, the ions are determined by the following methods:

phosphate by the formation of phosphomolybdate following sulfuric acid digestion or dry ashing.

citrate by pyridine and acetic acid.

calcium and magnesium by atomic absorption after dry ashing.

The sum of the molar concentrations of Ca and Mg after deduction of the molar concentration of citrate and, if necessary, the molar concentration of phosphate is expressed as in the above-mentioned relationships.

All the sterilization operations were carried out by heating the material to 95° C. for 5 mins., in accordance with the above-mentioned test. The heat stability of the whey proteins is given as the ratio of "nitrogen in solution after sterilization at the pH value under consideration":"nitrogen in the solution before sterilization" which is expressed as a percentage and determined in accordance with the abovementioned test.

Finally, the difference from 100% dry matter in the compositions corresponds to the lactose content.

COMPARATIVE EXAMPLES (a) Sweet whey is partially dialysed against deionised water. The resulting product has a pH value of 8.2, a dry matter content of 5.3% after evaporation with the following composition:

| | |
|---|---|
| proteins | 65.7% |
| Ca | 1.1% |
| Mg | 0.17% |
| ash | 4.6% |
| citrate | 0.54% |
| phosphate | 0.92% |

This gives a weight ratio of calcium:protein of 1.7:100, of ash:protein of 7:100 and calcium:ash of 24:100. However, [Ca+Mg−citrate]=17.0 mM and [Ca+Mg−citrate−phosphate]=11.9 mM.

Although this product has a composition corresponding to the definition given by the above-mentioned prior art, its proteins have a heat stability of less than 40% for a pH ranging form 4.5 to 8.0.

(b) Sweet whey is ultrafiltrated in an industrial apparatus. The resulting product has a pH of 6.8, a dry matter content of 13.2% with the following composition:

| proteins | 82.6% |
|---|---|
| Ca | 0.86% |
| Mg | 0.07% |
| ash | 2.8% |
| citrate | 0.10% |
| phosphate | 0.95% |

[Ca+Mg−citrate]=31.7 mM and [Ca+Mg−citrate−phosphate]=18.4 mM.

Although this product also has a composition corresponding to the definition given by the above-mentioned prior art, its proteins have a heat stability of less than 60% at a pH value of 8.0 and even less at a pH value of 7.5.

EXAMPLE 1

Sweet whey is produced from skimmed milk by adding rennet and heating to 40° C. to form the curds, but without pasteurising the milk. The whey is concentrated by evaporation under vacuum and is freeze-dried to produce a powder.

The powder is dissolved in demineralised water to reconstitute a solution which has the same composition as the original sweet whey. The pH of the solution is 6.0, the dry matter content is 6.0% which has the following composition:

| proteins | 12% |
|---|---|
| Ca | 0.46% |
| Mg | 0.10% |
| ash | 7.6% |
| citrate | 2.23% |
| phosphate | 1.71% |

[Ca+Mg−citrate]=2.0 mM.

The concentration of Ca+Mg−citrate is adjusted to −3 mM by adding 5 mM of sodium citrate and the product is then sterilized. The proteins have a heat stability of 86%.

If, by way of comparison, an attempt is made to sterilize the solution as such, the heat stability of the proteins is found to be less than 50%.

EXAMPLE 2

Sweet whey which has been demineralised by ion exchange has a pH of 6.8 and a dry matter content of 6.0% which has the following composition:

| proteins | 12.6% |
|---|---|
| Ca | 0.02% |
| Mg | 0.06% |
| citrate | 0.66% |
| phosphate | 0.3% |
| ash | 0.52% |

[Ca+Mg−citrate]=−0.1 mM.

Citric acid and calcium hydroxide are added in equimolar quantities to adjust the calcium content of the product to 0.35% of dry matter. The pH is adjusted to 6.0 by adding NaOH. The product may be subsequently concentrated by evaporation and spray-dried or sterilized. The proteins of the product have a heat stability of 85%.

In contrast, if, by way of comparison, citrate and calcium are used in a molar ratio of 2:3 to adjust the calcium content of the product, the proteins have a heat stability of less than 50%. In other words, more than half the quantity of protein is rendered insoluble during evaporation and drying or sterilization. A further two mM of citrate are required to re-establish an ionic medium which ensures that the proteins have a heat stability of greater than 80%.

EXAMPLE 3

Sweet whey is produced which has been demineralised to 85% by ion exchange or dialysis and has a pH of 6.7 and a dry matter content of 6.0 which has the following composition:

| proteins | 12% |
|---|---|
| Ca | 0.34% |
| Mg | 0.03% |
| ash | 2.0% |
| citrate | 0.4% |
| phosphate | 0.5% |

[Ca+Mg−citrate]=4.6 mM and [Ca+Mg−citrate−phosphate =1.4 mM.]

The pH of the product is adjusted to 7.5 by adding KOH and it may be sterilized. The heat stability of the proteins is greater than 80%.

In contrast, if, by way of comparison, the product is sterilized at a pH of from 6.5 to 7.0, too large a quantity of proteins precipitates. The heat stability of the proteins is less than 70%.

EXAMPLE 4

4 mM of sodium or potassium citrate are added to demineralised whey of the type described in Example 3. The product may be sterilized at a pH value of from 6.5 to 7.0. The heat stability of the proteins is greater than 80%.

EXAMPLE 5

Demineralised whey of the type described in Example 3 is concentrated to 24% of dry matter. 18 mM of sodium citrate is added and the concentrated whey may be sterilized. The heat stability of the proteins is greater than 80%.

EXAMPLE 6

Demineralised whey of the type described in Example 3 is diluted in a proportion of 1 part by volume of whey for every 2 parts by volume of de-ionised or softened water and the diluted whey may then be sterilized. The heat stability of the proteins is greater than 80%.

EXAMPLE 7

A sweet whey concentrate is produced by ultrafiltration which has a pH value of 8.3 and a dry matter content of 8.4% with the following composition:

| proteins | 78% |
|---|---|
| Ca | 0.88% |
| Mg | 0.08% |
| ash | 3.0% |
| citrate | 0.67% |

| | -continued | |
|---|---|---|
| phosphate | | 1.0% |

The concentrate is diluted with demineralised water in a proportion of 1 part by volume of concentrate for every 4 parts of water and may then be sterilized. The heat stability of the proteins is 95%.

In contrast if, by way of comparison, the concentrate is not diluted it cannot be sterilized. The heat stability of the proteins is only 37%. If the concentrate is only diluted in a proportion of 1 part by volume of concentrate for 1 part of water, the heat stability of the proteins is still only 42%.

EXAMPLES 8-13

A sweet whey concentrate is prepared by ultrafiltration which has a pH value of 6.8 and a dry matter content of 13% with the following composition:

| proteins | 82.6% |
|---|---|
| Ca | 0.86% |
| Mg | 0.07% |
| ash | 2.08% |
| citrate | 0.1% |
| phosphate | 0.95% |

[Ca+Mg−citrate]=31.0 mM and [Ca+Mg−citrate−phosphate]=18.0 mM.

If, by way of comparison, the product is sterilized as such after the pH has been adjusted to any value ranging from 4.5 to 9.0, the heat stability of the proteins is always found to be less than 40%.

A whey product, of which the proteins have a heat stability of greater than 80%, is prepared from the same whey concentrate for each of Examples 8 to 13 according to various embodiments of the present process. The various embodiments are described in the following with reference to the number of each Example. The composition based on dry matter: [Ca+Mg−citrate] when the pH value is <7.2 and [Ca+Mg−citrate−phosphate] when the pH value is ≧7.2, and the heat stability of the proteins of each of the products obtained are shown in the following table.

8. 15 mM of mono- or disodium phosphate are added to the product and the pH is adjusted to a value in the range from 7.2 to 9.0.

9. 15 mM of sodium citrate are added to the product and the pH is adjusted to a value ranging from 7.2 to 9.0.

10. The product is acidified to a pH of 5.0, dialysed against de-ionised water and the pH adjusted to a value ranging from 7.2 to 9.0.

11. The product is acidified to a pH of 4.5, dialysed against de-ionised water and the pH adjusted to a value ranging from 6.4 to 6.8.

12. The product is softened on a strong cationic ion exchanger (sulfoethyl cellulose) which has been regenerated with NaCl and the pH is adjusted to a value ranging from 6.0 to 7.0.

13. The product is demineralised on a strong cationic ion exchanger which has been regenerated by HCl and then on a strong anionic ion exchanger (diethylaminoethyl cellulose) which has been regenerated by NaOH and the pH is adjusted to a value ranging from 6.0 to 7.0.

| | Original concentrate | Product according to Example No | | | | | |
|---|---|---|---|---|---|---|---|
| | | 8 | 9 | 10 | 11 | 12 | 13 |
| Composition % | | | | | | | |
| protein | 82.6 | 81.7 | 80.2 | 85.0 | 87.3 | 85.5 | 87.2 |
| Ca | 0.86 | 0.85 | 0.84 | 0.32 | 0.13 | 0.04 | 0.01 |
| Mg | 0.07 | 0.07 | 0.07 | 0.03 | 0.01 | 0.01 | 0.00 |
| ash | 2.8 | 3.82 | 3.5 | 1.7 | 0.7 | 2.4 | 0.4 |
| citrate | 0.1 | 0.1 | 2.2 | 0.04 | 0.14 | 0.04 | 0.02 |
| phosphate | 0.95 | 1.65 | 0.92 | 0.73 | 0.67 | 0.50 | 0.13 |
| [Ca + Mg - citrate] mM | 31.0 | | | | 3.8 | 1.6 | 0.2 |
| [Ca + Mg - citrate - phosphate] mM | 18.0 | 3.0 | 3.0 | 1.5 | | | |
| Stability under the effects of heat % | 40 | 87 | 82 | 82 | 96 | 98 | 98 |

In Example 9, the product is heated by steam injection to 140° C. over a period of 10 mins. and the heat stability of the proteins remains above 95%.

In this specification only an upper limit which must not be exceeded for [Ca+Mg−citrate] or [Ca+Mg−citrate−phosphate] is considered. The above-mentioned relationships between the Ca, Mg, citrate and/or phosphate concentrations and the pH are formulated accordingly. There is generally no question of a recommended lower limit. Indeed, the lower limit will always be determined from a nutritional point of view and in particular in terms of the maximum citrate content of the product for the production of which the product obtained by the present process is used. Therefore, in the above-mentioned relationships [Ca+Mg−citrate] and [Ca+Mg−citrate−phosphate] should generally never be below −20 mM.

We claim:

1. A process for preparing a heat stable aqueous solution of whey proteins having a pH in the range of from 6.2 to less than 7.2 wherein at least 80% of the whey proteins remain soluble when heat treated which comprises preparing an aqueous solution containing a solute which consists essentially of dry matter of soluble whey proteins and adjusting the concentration of Ca+Mg−citrate such that the concentration of Ca+Mg−citrate is less than 4 mM.

2. A process according to claim 1 wherein the whey proteins are selected from the group consisting of sweet whey proteins and acid whey proteins.

3. A process according to claim 2 wherein the aqueous solution of whey proteins has been demineralised by ion exchange prior to adjusting the concentration of Ca+Mg−citrate.

4. A process according to claim 2 wherein the aqueous solution of whey proteins has been processed by a process selected from the group consisting of dialysis ultrafiltration and diafiltration prior to adjusting the concentration of Ca+Mg−citrate.

5. A process according to claim 1 wherein the concentration of Ca+Mg−citrate is adjusted by diluting the solution with demineralized water.

6. A process according to claim 1 wherein citrate is added to the aqueous solution to adjust the concentration of Ca+Mg−citrate.

7. A process according to claim 1 wherein the whey proteins are sweet whey proteins and the concentration of Ca+Mg−citrate is adjusted by a process selected from the group consisting of dialysis, ultrafiltration and diafiltration and combinations thereof at a pH of about 4.5 and subsequently adjusting the pH value to the pH of from 6.2 to less than 7.2.

8. A process according to claim 6 wherein calcium is also added to the aqueous solution in an equimolar amount with citrate to adjust the concentration of Ca+Mg−citrate.

9. A process according to claim 1 wherein calcium is added to the aqueous solution to adjust the concentration of Ca+Mg−citrate.

10. A process according to claim 1 or claim 8 or claim 9 wherein calcium constitutes about 0.34% to 0.46% of the dry matter content of the adjusted solution.

11. A process according to claim 1 wherein magnesium is added to the aqueous solution to adjust the concentration of Ca+Mg−citrate.

12. A process according to claim 10 wherein the calcium constitutes about 0.35% of the dry matter content of the solution.

13. A process for preparing a heat stable aqueous solution containing a solute which consists essentially of dry matter of soluble whey proteins wherein at least 80% of the whey proteins remain soluble when heat treated, wherein the pH of the solution is in the range of from 6.2 to less than 7.2 and wherein the sum of the concentrations of Ca and Mg minus the concentration of citrate in the solution is greater than 4 mM, which comprises adjusting the concentrations of Ca, Mg and citrate in the solution such that the sum of the concentration of Ca and Mg minus the concentration of citrate is less than 4 mM.

14. A process for preparing a heat stable aqueous solution containing a solute which consists essentially of dry matter of soluble whey proteins wherein at leat 80% of the whey proteins remain soluble when heat treated, wherein the pH of the solution is lower than 6.2 or higher than 7.2 end wherein the sum of the concentrations of Ca and Mg minus the concentration of citrate in the solution is less than 4 mM, which comprises adjusting the pH of the solution to in the range of from 6.2 to less than 7.2.

15. A process for the production of an aqueous solution of whey proteins which have a heat stability of at least 80% which comprises preparing an aqueous solution, the solute of which consists essentially of dry matter of demineralised whey, maintaining the pH of the solution at a value of from 6.2 to less than 7.2 and adding Ca and citrate to the solution such that the Ca consistutes about 0.34% to 0.46% of the dry matter content of the solution and such that the sum of the concentration of Ca and Mg minus the concentration of citrate of the solution is less than 4 mM.

16. A process according to claim 1 or 13 or 14 or 15 wherein the sum of the concentration of Ca and Mg minus the concentration of citrate is between −20 mM and less than 4 mM.

* * * * *

UNITED STATES PATENT AND TRADEMARK OFFICE
CERTIFICATE OF CORRECTION

PATENT NO. : 4,748,034

DATED : May 31, 1988

INVENTOR(S) : Olivier de Rham

It is certified that error appears in the above-identified patent and that said Letters Patent is hereby corrected as shown below:

Column 1, line 20, "fruit flavoured" should be --fruit-flavoured--.

Column 1, line 25, "tne" should be --the--.

Column 1, lines 57-58, "abovemen-tioned" should be --above-mentioned--.

Column 2, line 49, "C." should be --C--.

Column 4, lines 10-11, "serine phosphate" should be --serine-phosphate--.

Column 4, line 12, "EDTA." should be --EDTA--.

Column 4, line 43, the sentence beginning with "The heat stability ..." should begin a new paragraph.

UNITED STATES PATENT AND TRADEMARK OFFICE
CERTIFICATE OF CORRECTION

PATENT NO. : 4,748,034

DATED : May 31, 1988

INVENTOR(S) : Olivier de Rham

It is certified that error appears in the above-identified patent and that said Letters Patent is hereby corrected as shown below:

Column 4, line 48, "abovementioned" should be --above-mentioned--.

Column 5, line 4, "form" should be --from--.

Column 5, line 26, "C." should be --C--.

Column 8, line 24, "C." should be --C--.

Column 10, line 10, [line 6 of claim 14], "end" should be --and--.

Signed and Sealed this

Thirteenth Day of December, 1988

Attest:

DONALD J. QUIGG

*Attesting Officer*    *Commissioner of Patents and Trademarks*